United States Patent [19]

Torii et al.

[11] Patent Number: 5,225,648
[45] Date of Patent: Jul. 6, 1993

[54] INDUSTRIAL ROBOT WITH CABLE ARRANGEMENT SYSTEM

[75] Inventors: Nobutoshi Torii, Hachioji; Susumu Ito, Yamanashi; Akihiro Terada, Yamanashi; Toshihiko Inoue, Yamanashi, all of Japan

[73] Assignee: Fanuc Limited, Yamanishi, Japan

[21] Appl. No.: 772,361

[22] PCT Filed: Mar. 7, 1991

[86] PCT No.: PCT/JP91/00309
§ 371 Date: Nov. 6, 1991
§ 102(e) Date: Nov. 6, 1991

[87] PCT Pub. No.: WO91/13731
PCT Pub. Date: Sep. 19, 1991

[51] Int. Cl.⁵ .............................................. B23K 26/00
[52] U.S. Cl. ................................. 219/121.6; 901/42
[58] Field of Search ........... 219/121.6, 121.67, 121.63, 219/121.64, 121.72, 121.78, 121.79, 121.84; 901/41, 42; 414/918; 248/51

[56] References Cited

U.S. PATENT DOCUMENTS

| | | |
|---|---|---|
| 4,468,070 | 8/1984 | Yasuoka . |
| 4,650,952 | 3/1987 | Akeel . |
| 4,705,243 | 11/1987 | Hartmann et al. ............. 248/51 |
| 4,780,045 | 10/1988 | Akeel et al. . |
| 4,855,560 | 8/1989 | Sonoda et al. ............. 901/42 X |
| 5,132,601 | 7/1992 | Ohtani ........................ 901/42 X |

FOREIGN PATENT DOCUMENTS

| | | |
|---|---|---|
| WO85/01686 | 4/1985 | Fed. Rep. of Germany . |
| 354387A1 | 7/1986 | Fed. Rep. of Germany . |
| 57-1684 | 1/1982 | Japan . |
| 60-177894 | 9/1985 | Japan . |
| 61-197187 | 9/1986 | Japan . |
| 2134074 | 8/1984 | United Kingdom ......... 901/42 |

Primary Examiner—C. L. Albritton
Attorney, Agent, or Firm—Armstrong, Westerman, Hattori, McLeland & Naughton

[57] ABSTRACT

An industrial robot provided with a cable arrangement system in which a hollow shaft (3) is arranged to extend vertically from a robot base (1) into a rotational trunk (2) about a rotational axis thereof, and a plurality of cables (7) are arranged to be spaced from one another around the outer periphery of the hollow shaft (3) by cable clamps (4) mounted on the outer periphery of the hollow shaft (3) and having a plurality of cable receiving grooves (41).

8 Claims, 9 Drawing Sheets (Robot when installed on the floor)

(Robot when suspended from the ceiling)

(Laser robot when installed on the floor)

(Laser robot when suspended from the ceiling)

INDUSTRIAL ROBOT WITH CABLE ARRANGEMENT SYSTEM

TECHNICAL FIELD

The present invention relates to an arrangement of a plurality of cables in an internal space of an industrial robot including a rotational trunk capable of rotating around a vertical axis relative to a robot base, in particular, in the internal space between a robot base and a rotational trunk. More specifically, the present invention is related to a system for a cable arrangement effectively applicable to a known laser robot in which a laser beam from a laser oscillator provided outside is introduced through a laser beam conduit into an inside of the machine body or a motion unit of the robot, and the laser beam is irradiated on a workpiece to be processed by a laser beam emitting device provided at an extremity of a robot arm of the laser robot.

BACKGROUND ART

In industrial robot, it is necessary to arrange cables inside the machine body, to thereby supply operating elements such as a robot arm, robot wrist and end-effector with electric power, electric signals, pressurized air, and work-assisting gas and the like. For example, U.S. Pat. No. 4,540,332 discloses a system for arranging cables by which damage to the cables is prevented. The cable arrangement system disclosed in U.S. Pat. No. 4,540,332, however, is not designed to hold a plurality of cables within the robot body by a cable holding means, and to distribute the cables.

The conventional cable arrangement within the rotational trunk applicable to the laser robot employs a cable arrangement system as shown in FIGS. 7 through 9B. Namely, as can be clearly seen from FIGS. 7, 8A, and 8B, to retain the lower cable group, two support metal plates 91 are provided, each of which is inwardly horizontally extended from one of the apertures 1a and 1b at both sides of the robot base 1, and metal clamps 92 each having a cable holding portion with a rectangular section are fixed to the end of each support plate 91, to thereby hold two groups of cables 7a and 7b, respectively. Then the two groups of cables 7a and 7b are tied to form a single cable bundle 7c at the center, and are led upward. Next, as shown in FIGS. 7, 9A, and 9B, the cable bundle 7c extending upward from an interior of the robot base 1 to an interior of the rotational trunk 2 (θ designates a rotational direction about the vertical axis), is arranged so as to pass through the space between the ends of two support metal plate 93 each extending from windows 21a, 21b at both sides of the rotational trunk 2, to the center thereof. Clamps 94 formed from metal plate having a rectangular section are then fastened to the respective support plates 93 arranged face to face to thereby hold therein, respective, one each of the half bundles of the bundle cable 7c, as best shown in FIG. 9B.

As clearly understood from the above description, in the conventional cable arrangement system, the cable bundle 7c extends upward from the interior of the robot base 1 along the rotational axis of the robot rotatable trunk 2 within the industrial robot, and therefore, the conventional laser robot incorporating such a cable arrangement system employs a structure in which an outer laser beam conduit 96 extends from a laser oscillator 95 located outside, to reach a position in register with the rotational axis of the rotatable trunk 2 via a beam conduit support 97 mounted on the upper part of the robot machine body, as shown in FIGS. 10A and 10B.

The system for arranging the cable bundle 7c described above requires much cumbersome work when assembling the support plates 93, in which the cable 7c extending along the rotational axis is taken out through the trunk window 21a and 21b, retained by the clamps 94 outside the robot machine body, lead back into the rotational trunk 2 together with the support plates 93, and the two support plates 93 are fixed in the vicinity of the window 21a and 21b provided on the side of the rotational trunk 2. As a result, the cable arrangement work and the cable maintenance work requires an extraordinary amount of labor and time.

Further, since a laser beam conduit of the laser robot is supported by the beam conduit support 97 mounted on the upper part of the robot, such a beam conduit support 97 necessarily restricts a range of movement of the robot. Further, when the laser beam enters the robot from a top thereof, the outer laser beam conduit 96 must be arranged above the robot, and various parts and members needed to support the conduit must be provided in the vicinity of the robot machine body, and thus the arrangement of the peripheral equipment and the like in the region of the robot is restricted.

Also, since the laser beam can be introduced only from overhead, only the two methods shown in FIGS. 10A and 10B are applicable, i.e., the method in which the laser beam is introduced from overhead of a laser robot placed on the floor, and the method in which the robot base is mounted on the ceiling in such a way that the robot machine body is extended down toward the floor, and the laser beam is introduced from the top of the rotatable trunk.

DISCLOSURE OF THE INVENTION

An object of the present invention is to overcome the above problems encountered by the conventional cable arrangement system of the industrial robot.

Another object of the present invention is to provide an industrial robot provided with a system such that the cable can be dispersedly arranged around a hollow shaft within the robot base and the rotational trunk of the industrial robot.

A further object of the present invention is to provide a laser robot having a cable arrangement system provided within the robot base and the rotational trunk in such a manner that laser beam can be introduced from the bottom of the robot base into the interior of the robot.

To achieve the above-mentioned objects there is provided, in accordance with the present invention, an industrial robot including a robot base, a rotational trunk mounted on the base to be rotatable about a vertical axis, a robot motion assembly mounted on the rotational trunk, and a cable arrangement system for arranging cables connected from an outside to the robot base, to run inside the robot base and the rotational trunk, wherein the cable arrangement system comprises:

a hollow shaft means vertically extended from a bottom of the robot base through the interior of the rotational trunk along the vertical axis;

a plurality of cable holding means attached to a plurality of axially spaced positions on an outer periphery of the hollow shaft means, each of the cable holding means including a plurality of cable receiving means for receiving therein the cables to be circumferentially distributed around the hollow shaft means; and a means for fixing each of the plurality of cable holding means to the hollow shaft means.

Preferably, each of the above-mentioned cable holding means includes a cylindrical cable clamp member having at the outer periphery thereof a plurality of cable receiving grooves, and having at the center thereof a circular hole through which the hollow shaft means extends, a band member wound around the outer periphery of the cable clamp member to bind the cables received in the cable receiving grooves, and a mounting means for mounting the cable clamp member on the fixing means.

BRIEF DESCRIPTION OF THE DRAWINGS

The above and other objects, features and advantages of the present invention will become more apparent from the ensuing description of the embodiments with reference to the accompanying drawings wherein.

BEST MODE OF CARRYING OUT THE INVENTION

Figure 1:
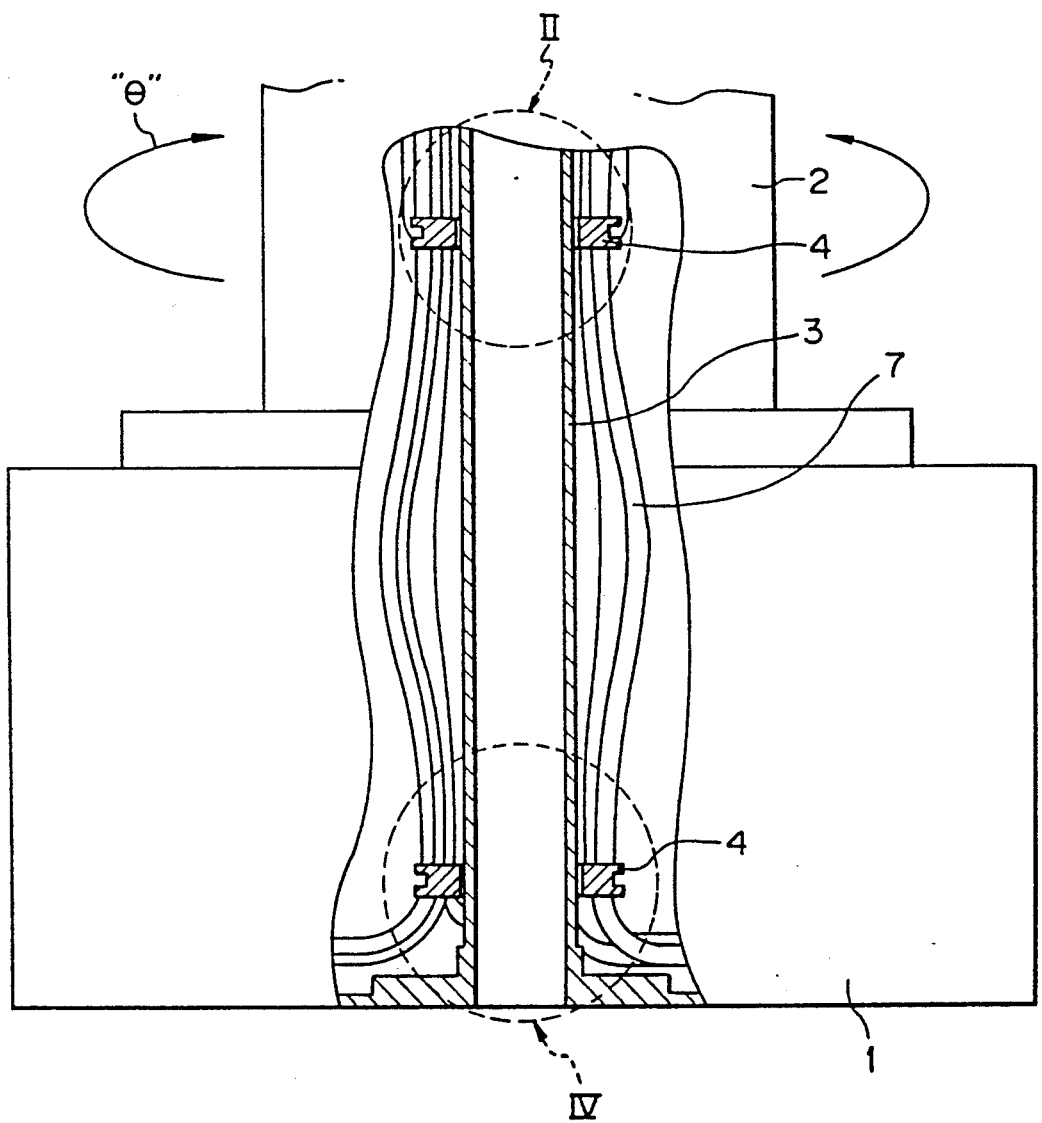
FIG. 1 is a side view with a longitudinal section of the principal part of the present invention.

An embodiment of the present invention will now be described with reference to FIGS. 1 through 5B. It should be noted that elements and parts identical to those described in relation to the prior art are identified by the same reference numerals.

Referring to FIG. 1, an industrial robot comprises a robot base 1, a rotational trunk 2 rotatably mounted on the top of the robot base 1 about a vertical axis, and a robot motion assembly (including a robot arm, a wrist, an end-effector and the like) not shown, mounted on the top of the rotational trunk 2.

Further, the industrial robot has a hollow shaft 3 extending vertically from the bottom center of the robot base 1 into the rotational shaft 2 and stationarily mounted along the rotation axis of the rotational trunk 2, and further, has a cable arrangement system in which a plurality of cables 7 are arranged from the lower part toward the upper part while retaining the cables 7 on the outer periphery of the hollow shaft 3 by a cable holding means, described later, placed on the outer periphery of the shaft 3.

According to this cable arrangement system, a plurality of cables 7 are arranged to be spaced from one another on the outer periphery of the hollow shaft 3, and thus the interior of the hollow shaft 3 provided vertically, to thereby extend from the bottom of the robot base 1 into the rotational trunk 2, defines a tubular space free from interference by the cables 7 and able to be used as a passage for a variety of purposes, for example, as a beam passageway for a laser beam.

Also, the above-mentioned cable holding means includes a cylindrical cable clamp 4 axially spaced on the hollow shaft 3, with the aid of a support means, and having on the outer periphery thereof a plurality of receiving grooves 41 for receiving a plurality of cables. Accordingly, when arranging the cables 7, each cable 7 is successively fitted into the corresponding cable receiving groove 41 of the clamp 4, and thereafter, only a band 8 need be wound therearound, which facilitates cable clamping during the cable arrangement work.

Figure 2:
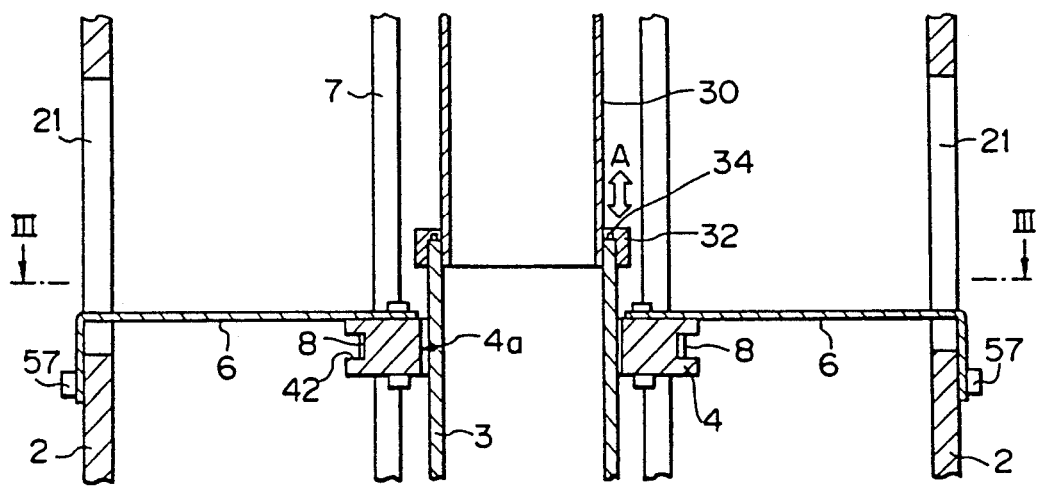
FIG. 2 is an enlarged view of the part II in FIG. 1.

As clearly shown in FIGS. 1 and 2, the upper end of the cylindrical hollow shaft 3, provided vertically so as to extend from the bottom center of the robot base 1 into the rotational trunk 2, reaches the vicinity of windows 21 of the rotational trunk 2. A hollow pipe 30 is provided above the hollow shaft 3, and a cap-like flange 32 mounted on the lower end of the hollow pipe 30 is fitted on the upper end of the shaft 3 via a sealing member 34. Noted, the hollow pipe 30 may be vertically shifted by the operator, as shown by the arrow "A", as required, thus making it possible to lift the flange 32 located at the lower end of the pipe 30 to be separated from the upper end of the hollow shaft 3.

Moreover, as illustrated in FIGS. 2, 3, 4, and 5A, the cable clamp 4 forming a cable holding means has at the center thereof a circular hole 4a through which the hollow shaft 3 is inserted. The circular hole 4a has an inner diameter larger than the outer diameter of the hollow shaft 3, to thus form a gap between the inner periphery of the circular hole 4a and the outer periphery of the hollow shaft 3.

A multiplicity of round grooves 41 for receiving the cables are arranged on the outer periphery of the cable clamp 4, formed as a cylindrical member having at the periphery thereof a circumferential groove 42 for guiding the band, and is made of a synthetic rubber such as a high nitride rubber. The clamp 4 further has an appropriate number of through-holes 43, 44 through which fastening bolts are inserted. As shown by the example in the drawings, the upper cable clamp 4 (located within the rotational trunk 2) and the lower cable clamp 4 (located within the robot base 1) in FIG. 1 may be the same member.

The arranging of the cable 7 will be described hereinbelow.

Figure 4:
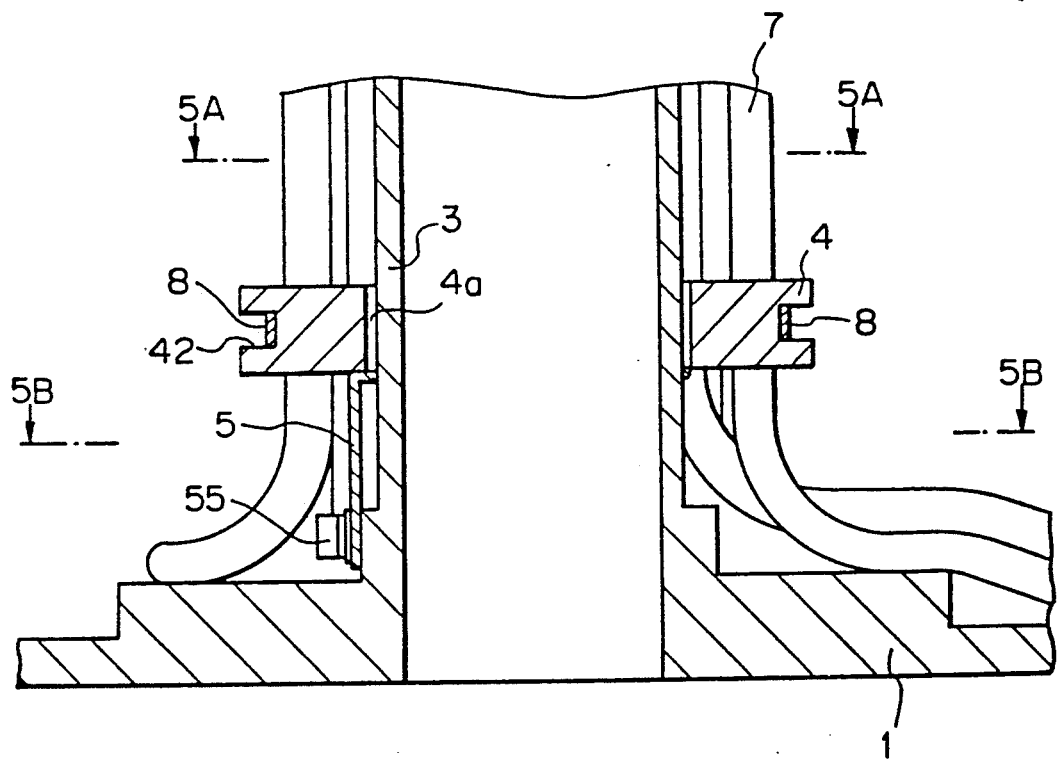
FIG. 4 is an enlarged view of the part IV in FIG. 1.
Figure 5A:
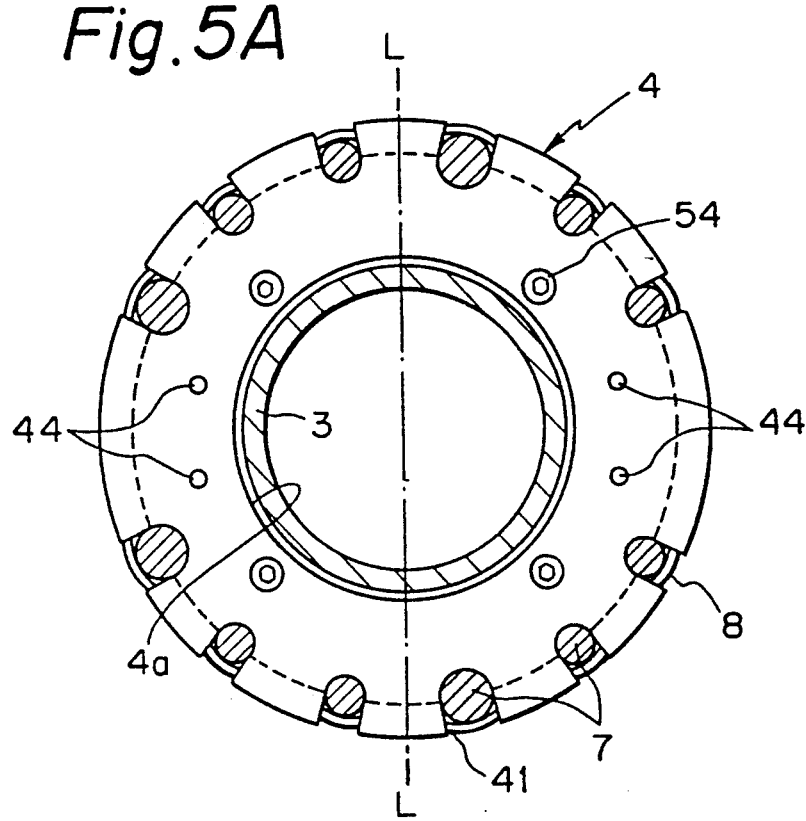
FIG. 5A is a sectional view taken along the line 5A—5A of FIG. 4.
Figure 5B:
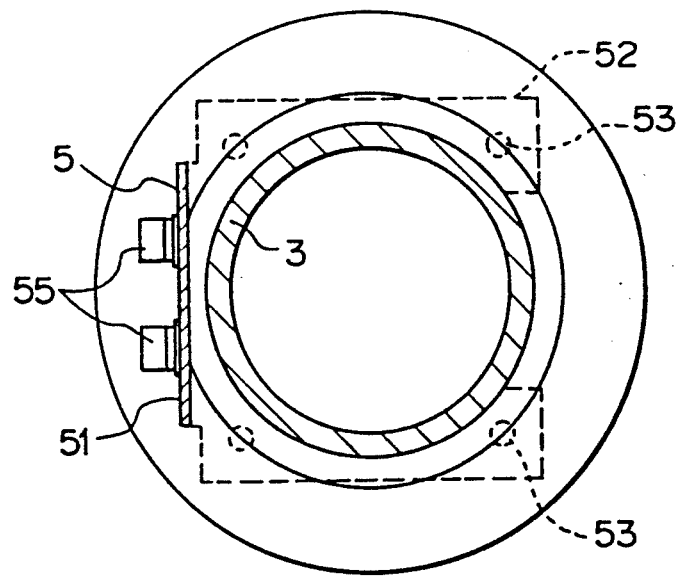
FIG. 5B is a sectional view taken along the line 5B—5B in FIG. 4.

As shown in FIGS. 4, 5A and 5B, the arrangement of a plurality of cables 7 is first carried out for the robot base 1. Namely, a support metal fitting 5 including a support part 52 and a leg part 51, and the lower cable clamp 4, are joined by bolts 54 through the bolt insertion holes 43 of the cable clamp 4 and the bolt insertion holes 53 of the support metal fitting 5, to form the lower cable clamp 4.

Subsequently, the above assembly is introduced into the rotational trunk 2 through the windows 21 of the rotational trunk 2, and the pipe 30 is lifted to form a gap between the flange 32 located at the lower end of the hollow pipe 30 and the upper end of the hollow shaft 3, to thus position the lower cable clamp 4 around the outer periphery of the hollow shaft 3, and then the support metal fitting 5 is moved down and fastened to the base of the hollow shaft 3 by bolts 55.

Figure 3:
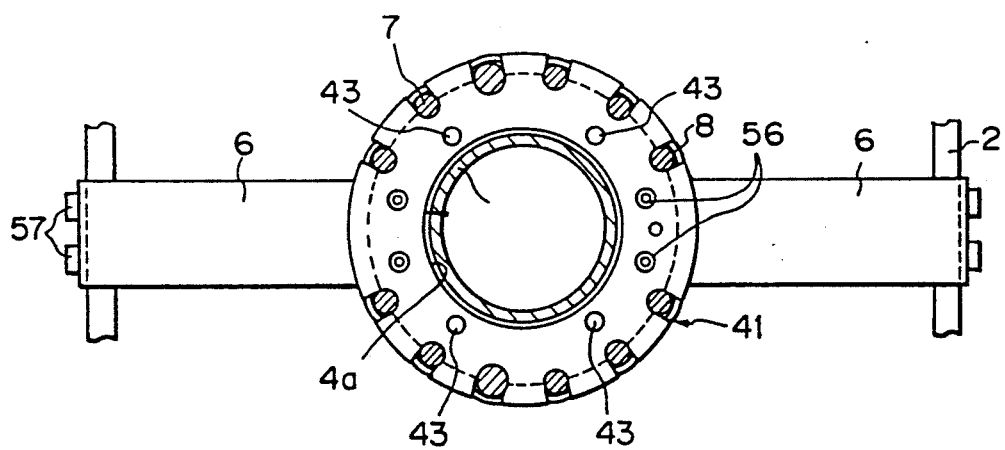
FIG. 3 is a sectional view, taken along the line III—III of FIG. 2.

Next, the upper cable clamp 4 is secured to each inner end of the support metal plates 6 arranged on both sides thereof, by bolts 56, through the bolt holes 44 located on both sides of the upper cable clamp 4 as shown in FIGS. 2 and 3. Then the upper clamp 4 together with the support metal plate 6 are introduced into the rotational trunk 2 through the windows 21 of the rotational trunk 2, and the hollow pipe 30 is lifted to separate the flange 32 at the lower end of the hollow pipe 30 from the upper end of the hollow shaft 3. Thereafter, the cable clamp 4 is fitted around the hollow pipe 3, and the outer ends of the support metal plates 6 are then fixed to the rotational trunk 2 by bolts 57.

Next, each of cables 7 hanging down from the upper side is fitted into the grooves 41 of upper and lower cable clamps, to fix the position thereof, and the band 8 made of nylon and having an end fitted with a Hook-and Loop fastener (trademark: magic tape) is wound within the groove 42 formed on the outer periphery of the cable clamp 4, to thereby fasten the cables 7. At that time, the cables 7 may be arranged with an appropriate slack within the robot base 1, as shown in FIG. 1, according to the rotational angle of the rotational trunk 2.

Figure 6A:
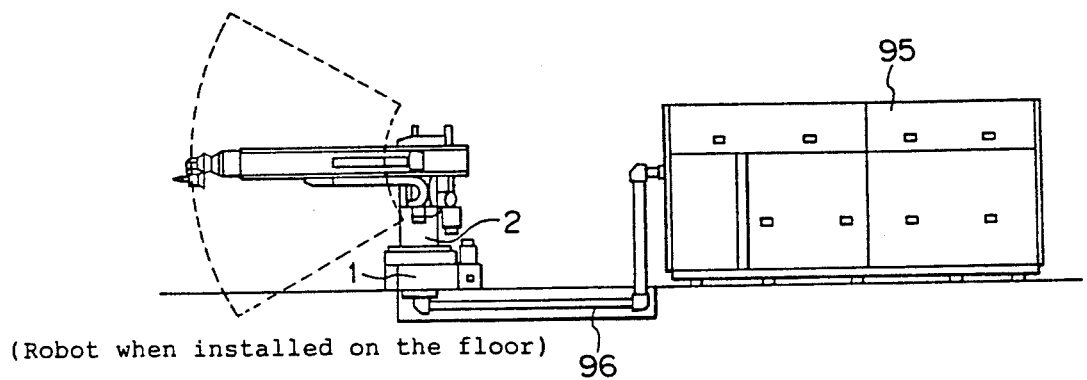
FIG. 6A is a schematic side view of a laser robot when disposed on a floor and incorporating the present invention.
Figure 6B:
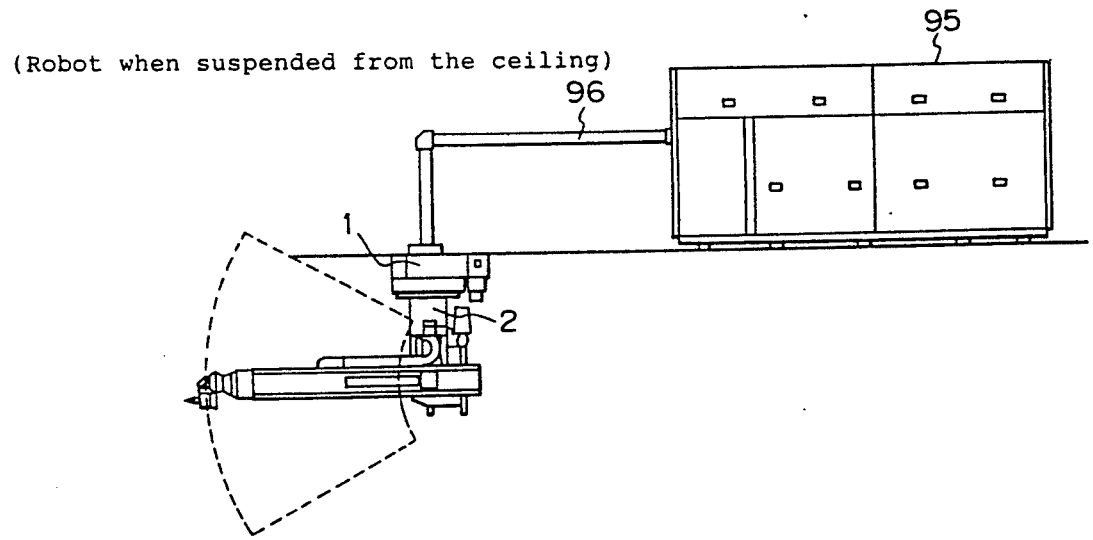
FIG. 6B is a schematic side view of the laser robot when suspended from the ceiling.
Figure 7:
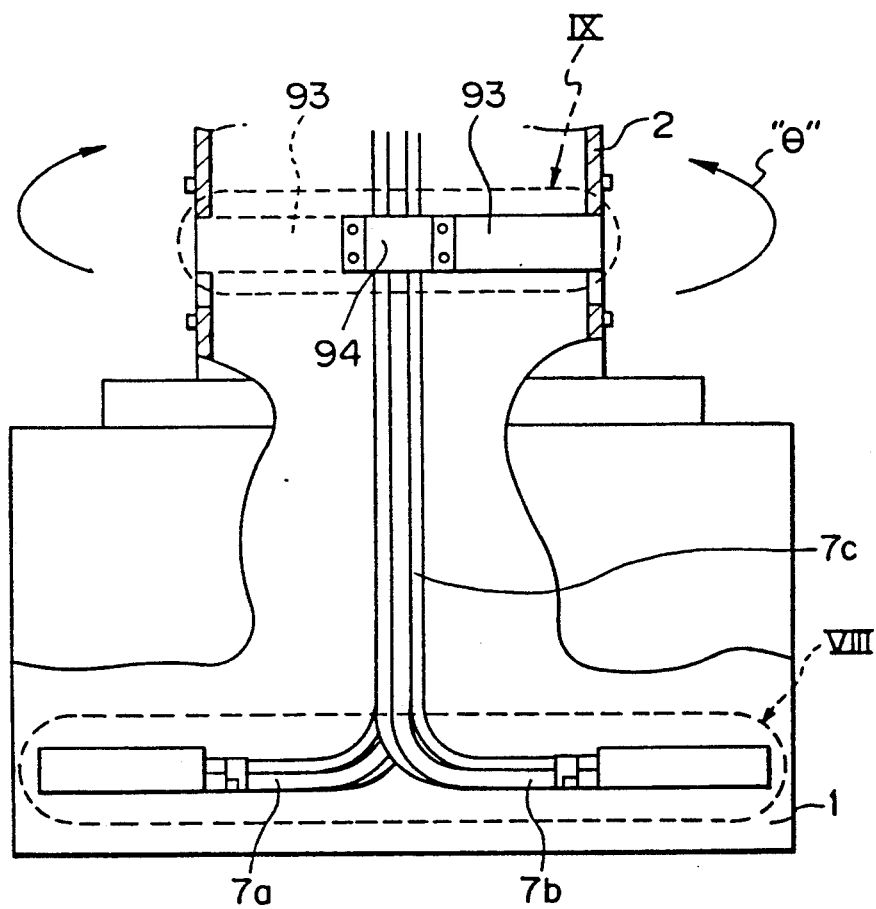
FIG. 7 is a side, longitudinal section view of the principal part of the structure of the conventional cable arrangement system.
Figure 8A:
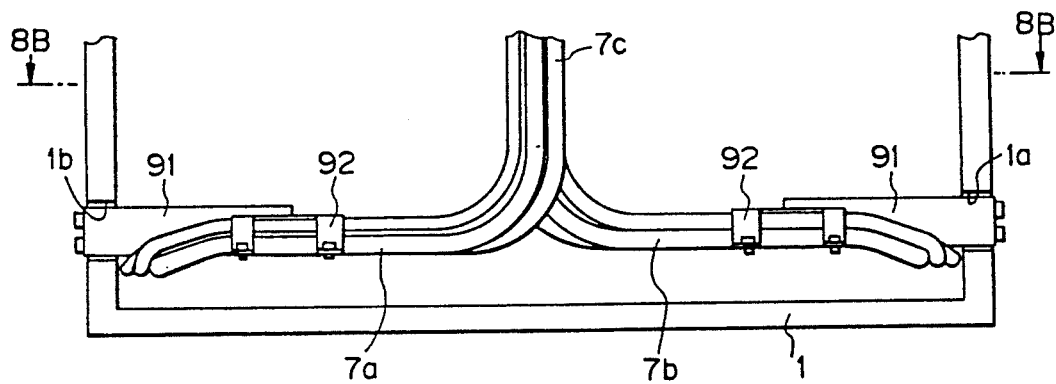
FIG. 8A is an enlarged view of the part VIII in FIG. 7.
Figure 8B:
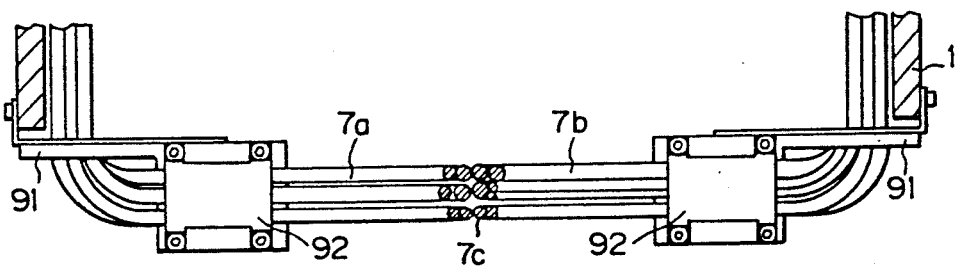
FIG. 8B is a sectional view taken along the line 8B—8B of FIG. 8A.
Figure 9A:
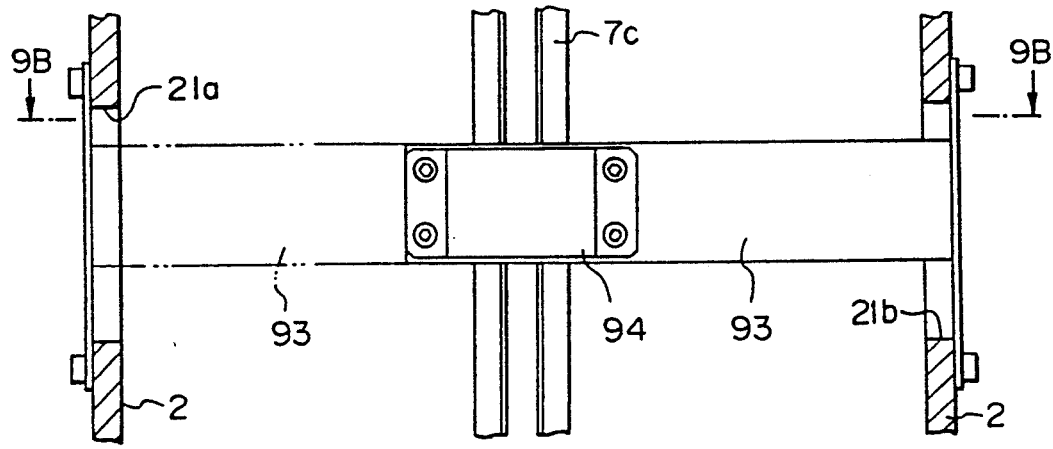
FIG. 9A is an enlarged view of the part IX in FIG. 7.
Figure 9B:
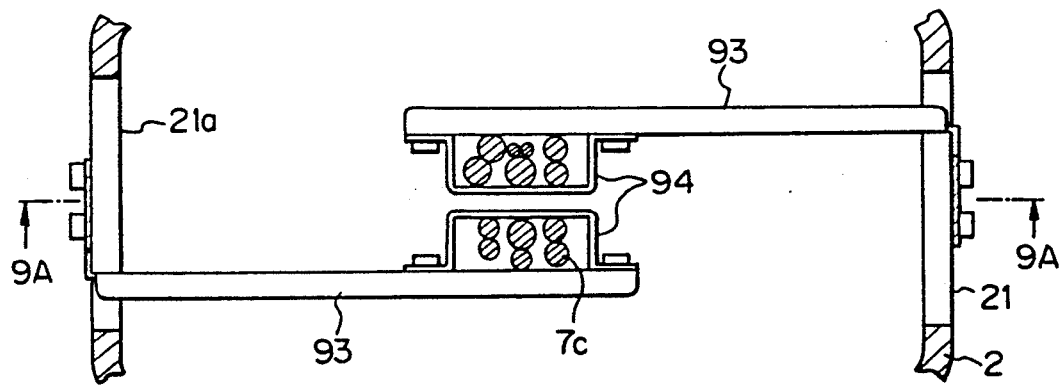
FIG. 9B is a sectional view taken along the line 9B—9B in FIG. 9A.
Figure 10A:
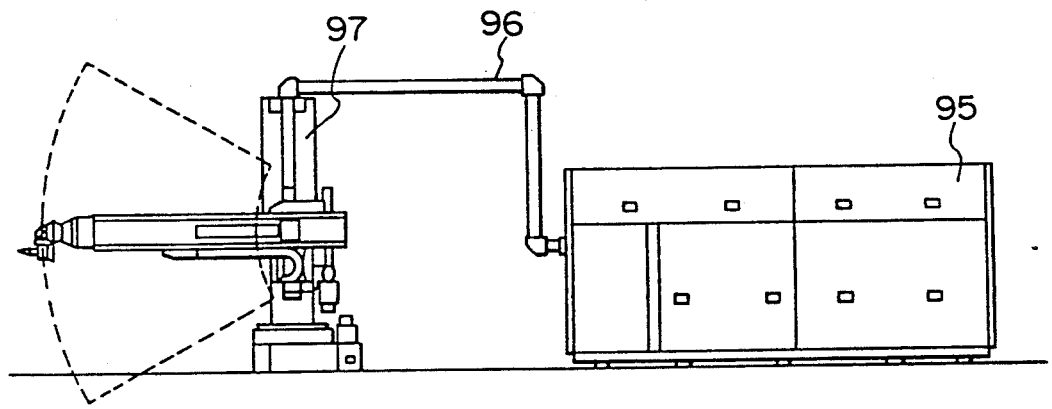
FIG. 10A is a schematic side view of the conventional laser robot when installed on a floor.
Figure 10B:
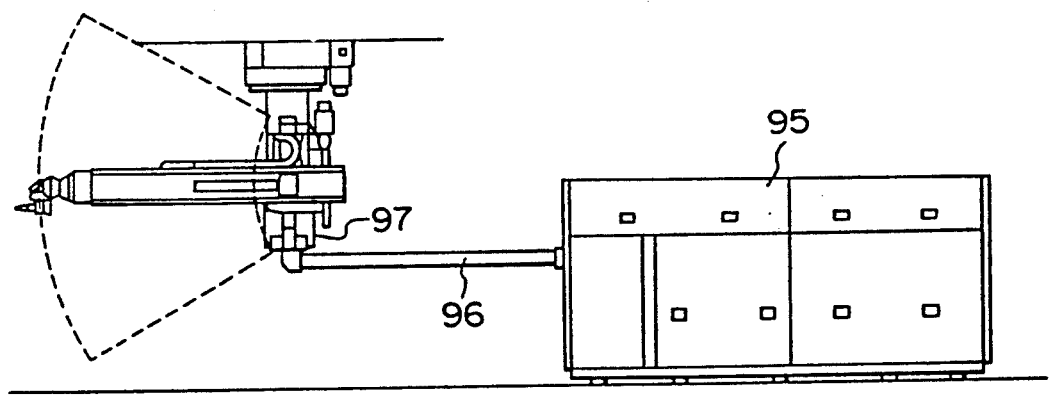
FIG. 10B is a schematic side view of the conventional laser robot when suspended from the ceiling.

In the thus-constituted cable arrangement system, each cable 7 is properly and dispersedly positioned with the aid of the cable supporting grooves 41 of the cable clamp 4, to thus allow an easy maintenance during any repair and replacement of the cables 7, compared with the conventional type in which the cables are held in a bundle. Also, the cable mounting work is simplified because the cables are successively fitted into the outer periphery of the cable clamp. Further, the hollow shaft 3 and the hollow pipe 30 can be utilized as a laser beam passageway, and thus the laser beam can be directed toward the robot base of the laser robot from the outside. Consequently, when the robot is placed on the floor as shown in FIG. 6A, the beam conduit can be connected to the hollow shaft 3 by arranging the conduit below the surface of the floor. Conversely, when the laser robot is suspended from the ceiling as shown in FIG. 6B, the laser beam conduit can be connected to the hollow shaft 3 by arranging the conduit on the ceiling, to thus eliminate the need for the support 97 (FIGS. 10A and 10B) used for supporting the conventional outer laser beam passageway and conduit.

Also, in the case of robots other than a laser robot, the above-mentioned shaft 3 can be utilized as a passageway for conduits and cables which should not be twisted.

Further, in the example shown in the drawings, the same member is applicable to both the upper and lower cable clamps, which facilitates the parts management and ensures a reduction of the production cost. Moreover, the cable clamp 4 has at the center thereof a through-hole 4a through which the hollow shaft 3 is inserted, which has an inner diameter larger than the outer diameter of the hollow shaft 3, and accordingly, when the cable clamp is rotated due to a rotation of the rotational trunk, no interference thereof occurs with the outer periphery of the hollow shaft 3.

It should be noted that the cable clamp 4 may be separated into two semi-circular segments, i.e., it may have a configuration divided along the line L—L in FIG. 5A.

Therefore, with regard to the lower cable clamp 4 provided within the robot base 1, the half segments may be each fixed to support metal fittings (not shown), and each metal fitting then inserted from the windows of the robot base 1 and secured to the lowermost base of the hollow shaft 3. Conversely, the half segments of the upper cable clamp 4 may be each fixed to the support metal fitting 6, to be introduced through the trunk windows 21, and then each support metal fitting 6 fixed in the region of the windows 21 of the rotational trunk 2 as in Example 1.

When the cables are arranged by using the half segment cable clamps 4, each cable clamp 4 is mounted to the hollow shaft 3 from the outside, and thus the clamp 4 need not be fitted through the upper end of the hollow shaft 3, as in the above-mentioned embodiment, and therefore, it is not necessary for the hollow pipe 30 located thereon to be lifted vertically as shown in the arrow A (FIG. 2). Namely, the hollow pipe 30 and the hollow shaft 3 can be integrally formed as a single hollow shaft.

As apparent from the above description, the industrial robot incorporating the cable arrangement system in accordance with the present invention ensures that, during the cable arrangement process, the cables are dispersedly arranged only by fitting the cables into the cable receiving grooves of the cable clamp, and thus the cable arrangement within the robot can be easily performed.

Also, the interior of the hollow shaft can be used as a laser beam passage, which allows the laser beam to be directed from the underside of the robot, to thereby eliminate the need to provide the support on the upper part of the robot, and the aerial laser beam passageway extending from the laser oscillator to the support, as required in the conventional laser robot, and this widens the range of movement of the robot.

Namely, if the laser beam is introduced from the underside of the laser robot, the aerial beam passageway extending above the robot and the members and parts for supporting the same in the conventional laser robot are not required, and as a result, when a peripheral equipment is to be arranged in the region of the robot, any interference between the aerial beam passageway and the support need not be considered, and thus also widens the operating range of the robot. Further, since the laser beam can be introduced from the underside of the laser robot, the robot may be disposed as shown in FIGS. 6A and 6B and as described above.

Also, the same cable clamps are equally applicable to both the upper side and the lower side, and this is advantageous to both the management of the parts for the industrial robot and a reduction in the production costs.

Moreover, since the cables are held around the outer periphery of the hollow shaft in a dispersed condition, the maintenance of each cable by an operator is facilitated.

We claim:

1. An industrial robot including a robot base, a rotational trunk mounted on said base to be rotatable about a vertical axis, a robot motion assembly mounted on said rotational trunk, and a cable arrangement system for arranging cables connected from an outside to said robot base, to run inside said robot base and said rotational trunk, wherein said cable arrangement system comprises:

a hollow shaft means extended vertically from a bottom of said robot base through said interior of said rotational trunk along the vertical axis;

a plurality of cable holding means attached to a plurality of axially spaced positions on an outer periphery of said hollow shaft means, each of said cable holding means including a plurality of cable receiving means for receiving therein said cables to be circumferentially distributed around said hollow shaft means; and a means for fixing each of said plurality of cable holding means to said hollow shaft means.

2. An industrial robot according to claim 1, wherein each of said plurality of cable holding means includes:

a cylindrical cable clamping member having an outer periphery thereof provided with a plurality of cable receiving grooves, and a central circular hole through which said hollow shaft means is extended;

a band member wound around said outer periphery of said cable clamp member, to thereby bind said cables received in said cable receiving grooves; and a mounting means for mounting said cable clamp member to said means for fixing each of the plurality of said cable holding means.

3. An industrial robot according to claim 2, wherein said cable clamp member comprises a structural member separable into two semi-cylindrical halves.

4. An industrial robot according to claim 2, wherein said cable clamp member is made of a synthetic rubber material.

5. An industrial robot according to claim 4, wherein said cable clamp member is a high nitride rubber member, and said band member is made of nylon.

6. An industrial robot according to claim 2, wherein said circular hole of said cylindrical cable clamp member has an inner diameter larger than an outer diameter of said hollow shaft.

7. An industrial robot according to claim 1, wherein said hollow shaft means comprises a stationary hollow pipe member fixed to a central position of said bottom of said robot base.

8. An industrial robot according to claim 7, wherein said industrial robot is a laser robot, and said hollow pipe member defines therein a part of a laser beam passageway for directing said laser beam from an underside thereof.

* * * * *